United States Patent
Karp et al.

(10) Patent No.: US 6,470,339 B1
(45) Date of Patent: Oct. 22, 2002

(54) RESOURCE ACCESS CONTROL IN A SOFTWARE SYSTEM

(75) Inventors: Alan H. Karp, Palo Alto, CA (US); Rajiv Gupta, Los Altos, CA (US); Arindam Banerji, Sunnyvale, CA (US); Chia-Chiang Chao, Saratoga, CA (US); Ernest Mak, Fremont, CA (US); Sandeep Kumar, San Jose, CA (US); Venkatesh Krishnan, Sunnyvale, CA (US); Guillermo Rozas, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/281,876

(22) Filed: Mar. 31, 1999

(51) Int. Cl.$^7$ .............................................. G06F 17/00
(52) U.S. Cl. .............................. 707/8; 707/9; 713/182; 713/155
(58) Field of Search ................ 707/1–206; 713/155.29; 709/223

(56) References Cited

U.S. PATENT DOCUMENTS

| | | | | |
|---|---|---|---|---|
| 2002/0091809 A1 | * | 7/2002 | Menzies et al. | 709/223 |
| 2002/0095570 A1 | * | 7/2002 | Eldridge et al. | 713/155 |
| 2002/0095607 A1 | * | 7/2002 | Lin-Hendel | 713/201 |

OTHER PUBLICATIONS

Tzeng, "A Time–Bound Cryptographic Key Assignment Scheme for Access Control in a Hierarchy", Knowledge and Data Engineering, IEEE Transactions on, vol. 14, Issue 1, Jan.–Feb. 2002, pp. 182–188.*

Sloman et al., "Security and management policy separation", IEEE Network, vol. 16, Issue 2, Mar.–Apr. 2002, pp. 10–19.*

Wen et al., "A formal–compliant configurable encryption framework for access control of video", Circuits and Systems for Video Technology, IEEE Transaction on, vol. 12, Issue 6, Jun. 2002, pp. 545–557.*

Andrew S. Tanenbaum et al. "Experiences with the Amoeba Distributed Operating System" Dec. 1, 1990 pp. 46–63.

Li Gong "A Secure Identity–Based Capability System" May 1, 1989 pp. 56–63.

Paul A. Karger "New Methods for Immediate Revocation" May 1, 1989 pp. 48–55.

Robert Van Renesse et al. "The Performance of the Amoeba Distibuted Operating System" Mar. 1, 1989 pp. 223–234.

J. J. Hwang "A New Access Control Method Using Prime Factorisation" Feb. 1, 1992 pp. 16–20.

* cited by examiner

*Primary Examiner*—David Jung (57) ABSTRACT

A software system that provides access control to resources and that disassociates access rights to resources from references to resources to prevent the formation of large and unwieldy access control lists and to enable advanced decentralized security controls. The software system includes a repository that holds a resource descriptor for each resource including lock/permission pairs. Access to particular resources or groups of resources is provided by providing users with the appropriate keys. The keys are themselves are resources with resource descriptors in the repository. Access rights for users may be revoked by deleting keys from the repository. The software system also provides visibility fields for compartmentalizing access to resources. In addition, the software system provides authorizers that maintain audit trails when critical resource such as keys are passed among users and that enable advanced security control when passing resources among users.

18 Claims, 4 Drawing Sheets

RESOURCE ACCESS CONTROL IN A SOFTWARE SYSTEM

BACKGROUND OF THE INVENTION

1. Field of Invention

The present invention pertains to the field of software systems. More particularly, this invention relates to resource access control in a software system.

2. Art Background

Software programs executing on a computer system commonly make use of resources available through the computer system. Such resources commonly include resources such as files, databases, memory segments and application programs. Such resources also commonly include resources such as storage devices, printers, communication devices, and display devices to name only a few example devices. Such resources may be local resources of the computer system or may be remote resources accessible via a network connection to one or more other computer systems of a distributed system. A software program executing on the computer system that accesses resources is hereinafter referred to as a task.

Prior computer systems typically include an operating system that provides access control to the resources of the computer system. A task usually generates an access request that specifies a particular resource and that specifies a particular operation to be performed on the particular resource. For example, a task usually accesses a file by generating an access request that specifies a file name and a particular operation to be performed such as read file, write file, or read and write file. The operating system in a prior computer system usually provides access control by determining whether the requesting task is to be allowed to perform the particular operation on the particular resource.

Some prior operating systems maintain access control lists (ACLs) which are used in rendering access control decisions. An ACL for a resource typically includes a list of users and their associated permissions with respect to the resource. For example, an ACL for file1 may specify that user1 has read permission and user2 has read and write permission for file1. Typically, the operating system denies a request from a task associated with user1 for a write operation on file1 in response to the ACL for file1. On the other hand, the operating system usually allows a request from a task associated with user2 for a write operation on file1 in response to the ACL for file1.

Unfortunately, ACLs can become prohibitively large and unwieldy if a computer system is to service potentially large numbers of users. This problem may arise in networks such as large intranets or in the Internet in which the number of users that can potentially access a resource is extremely large.

Other prior operating systems allocate capability lists (CLs) to individual users. A CL for a user typically includes a list of resources and associated permissions with respect to the resource. For example, a CL allocated to user1 may specify read permission to file1 and read and write permission for file2.

Typically, CLs are objects contained within the operating environment of a user and as such may be subject to modification by the user. Unfortunately, this may create security problems in a computer system by enabling a user to obtain greater access right than were originally allocated. In addition, CLs may create problems with the proliferation of permissions among users and may complicate the ability of an operating system to revoke the permissions of individual users.

SUMMARY OF THE INVENTION

A software system is disclosed that provides access control to resources and that disassociates access rights to resources from references to resources to prevent the formation of large and unwieldy access control lists and to enable advanced decentralized security controls. The software system includes a repository that holds a resource descriptor for each resource. Each resource descriptor includes a set of lock/permission pairs for the corresponding resource. The software system includes a resource mediator that obtains a request for access to a particular resource of the resources. The request provides a set of keys. In response, the resource mediator generates a set of unlocked permissions by comparing each key to each lock of the lock/permission pairs for the particular resource so that a permission of the lock/permission pairs is unlocked if at least one of the keys matches the corresponding lock. The resource mediator forwards the unlocked permissions to a resource handler for the particular resource which interprets the unlocked permissions.

Access to particular resources or groups of resources is provided by providing users with the appropriate keys. The keys are themselves are resources with resource descriptors in the repository. Access rights for users may be revoked by deleting keys from the repository. The software system also provides visibility fields for compartmentalizing access to resources. In addition, the software system provides decentralized authorizers that maintain audit trails for resources and that enable advanced security control for access to resources.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
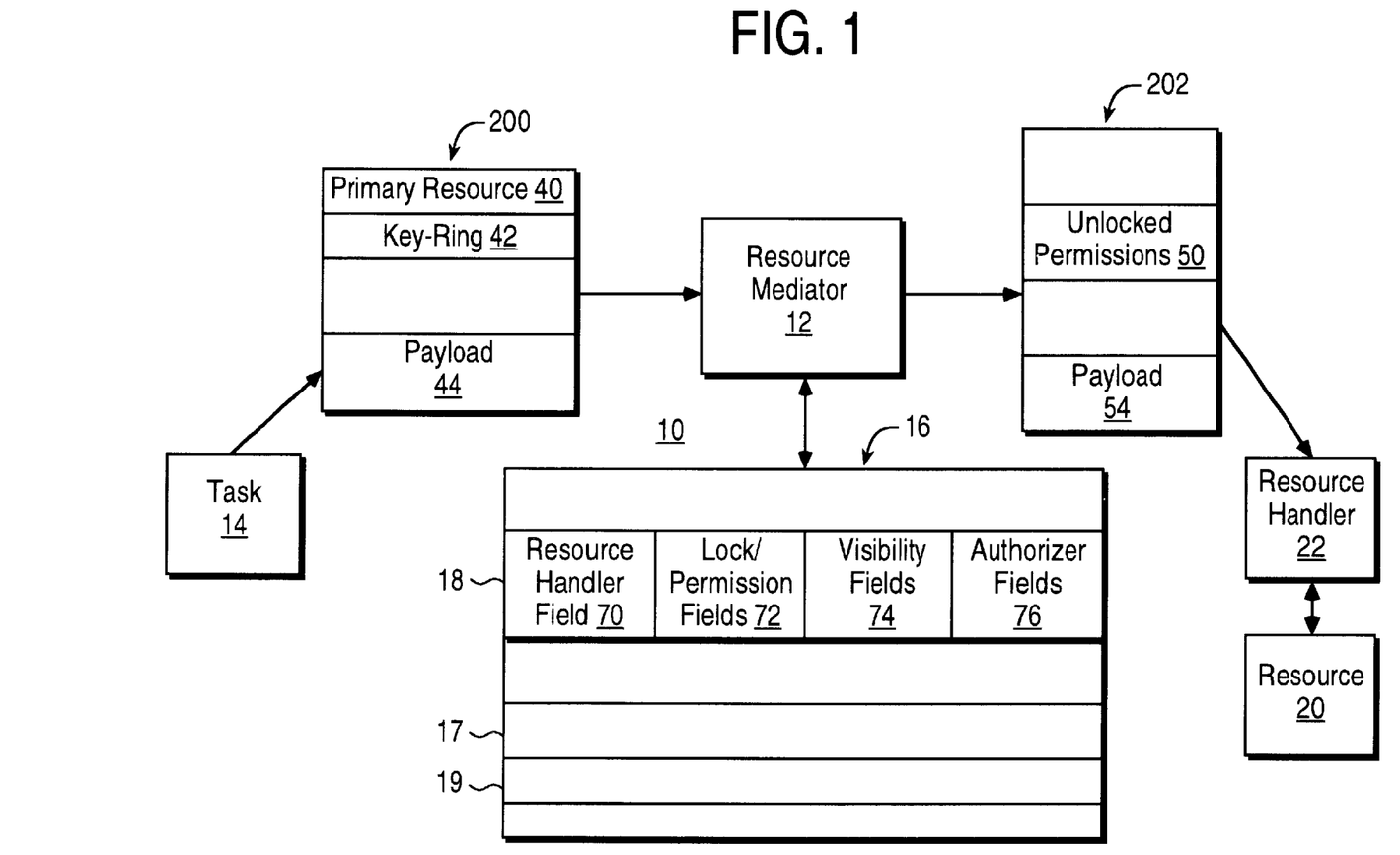
FIG. 1 illustrates a software system that provides access control according to the present techniques.

FIG. 1 illustrates a software system 10 that provides access control according to the present techniques. The software system 10 includes a resource mediator 12 and a repository 16 that enable a task 14 to access a resource 20. The resource 20 is managed by a resource handler 22.

The software system 10 keeps access rights to resources such as the resource 20 separately from the references to the resources. Access rights may also be referred to as permissions. The access rights to a resource are allocated to and kept by user tasks such as the task 14 using key-rings and keys. The references to resources on the other hand are kept as separate bindings between local names used by tasks and references to resource descriptors in the repository 16. This disassociation of access rights from references to resources prevents the formation of large and unwieldy access control lists.

The repository 16 holds resource descriptors for the resources of the software system 10. For example, a resource descriptor 18 corresponds to the resource 20. The resource descriptor 18 is created when the resource handler 22 registers the resource 20 to the resource mediator 12. The repository 16 also holds resource descriptors for additional components including key-rings and keys associated with access control and in-boxes and out-boxes used for messaging in the software system 10.

The resource descriptor 18 includes a resource handler field 70, a set of lock/permission fields 72, a set of visibility fields 74, and a set of authorizer fields 76. The resource handler field 70 holds a reference to an in-box for the resource handler 22. The resource mediator 12 uses the contents of the resource handler field 70 to determine where to forward messages such as requests that name the resource 20 as a primary resource.

The lock/permission fields 72 hold a set of lock/permission pairs for the resource 20. The resource mediator 12 matches these lock/permission pairs to keys provided with requests for access to the resource 20. For example, the lock/permission fields 72 may include a field which associates a lock of 28CFA3 to a read permission for the resource 20, a field that associates a lock of 3F323B to a write permission for the resource 20, and a field that associates a lock of AD9732 to an execute permission for the resource 20. In this example, a user task must provide a key of 28CFA3 to unlock a read permission, a key of 3F323B to unlock a write permission, and a key of AD9732 to unlock an execute permission for the resource 20.

The resource handler 22 sets up the permissions for the resource 20 by providing a list of lock/permission pairs to the resource mediator 12 for insertion into the resource descriptor 18. The lock/permission fields 72 may include additional fields that associate additional locks to additional permissions or the same permissions. For example, multiple locks may be associated with the read, write, and/or execute permissions. For example, one users permission to read a particular resource may be revoked by removing a read permission from the resource descriptor or deleting the corresponding key from the repository while the read permission for another user remains intact.

The visibility fields 74 include an allow field and a deny field which are used to control whether a user task is allowed to use the resource 20. A user task can only use the resource 20 if it presents keys that match at least one value in the allow field of the visibility fields 74. A user task is not allowed to use the resource 20 if it presents keys that match at least one value in the deny field of the visibility fields 74. If a key matches any value in the deny field or no key matches any value in the allow field, then the resource mediator 12 when handling a request acts as if the resource 20 does not exist, i.e. is not visible to the requesting user task.

For example, the visibility fields 74 may include an allow field which holds 00000 and a deny field which holds FFFFFF. In this example, a user task can only use the resource 20 if it presents a 000000 key and is not allowed to use the resource 20 if it presents an FFFFFF key. The visibility fields 74 may include additional allow and/or deny fields that hold additional allow and/or deny values.

The visibility fields in the repository 16 may be used to implement compartments so that if a user is allowed to see a first set of resources then the user is not allowed to see a second set of resources. This may be accomplished by placing lock1 in the deny fields and lock2 in the allow fields of the first set of resources and placing lock2 in the deny fields and lock1 in the allow fields of the second set of resources and allocating lock1 to a first user and lock2 to a second user. The first user presents lock1 in a request and is allowed to see the second set of resources but not the first set of resources. The second user presents lock2 in a request and is allowed to see the first set of resources but not the second set of resources.

The visibility fields may also be used to control access to critical system resources such as configuration files or log files of the software system 10. For example, each user in the software system 10 is associated with a mandatory key-ring. The mandatory key-ring of a particular user is automatically presented on each request from a task associated with the particular user. A particular user may be locked out of a critical file by placing a lock in the deny field of the critical file and placing a matching key on the mandatory key-ring for the particular user. The mandatory key-ring is useful for controlling the access of guest users to sensitive resources of the software system 10.

The mandatory key-rings may also be used to implement military style security in the software system 10. For example, a secret user may have read permission to unclassified files, read/write permissions to secret files and write permission to top secret files. The mandatory key-rings of unclassified users hold an unclassified_key (UK) and the mandatory key-rings of secret users hold a secret_key (SK). The lock/permission fields of unclassified files hold SK/read, UK/read, and UK/write pairs. The lock/permission fields of secret files hold SK/read, SK/write, and UK/write pairs. The lock/permission fields of top secret files hold SK/write and UK/write pairs.

If a secret user wants to write an unclassified file it can't because of the keys on the mandatory key-ring for the secret user. The secret user may request an explicit audit-able action which if granted removes the SK key and replaces it with the UK key on the mandatory key-ring of the secret user.

The authorizer fields 76 enable advanced security control for the resource 20. The authorizer fields 76 may designate one or more resource authorizers for the resource 20. A designated authorizer may be a notify authorizer or a grant authorizer. Notify authorizers are notified by the resource mediator 12 of the transfer of a binding for the resource 20. This enables a notify authorizer to maintain an audit trail for the resource 20. Grant authorizers control which tasks are allowed to obtain a binding to the resource 20.

In one embodiment of the software system 10, communication between the resource mediator 12 and tasks such as the task 14 and the resource handler 22 is accomplished using a in-box/out-box messaging structure. The task 14 has an out-box for providing messages to the resource mediator 12. The out-box of the task 14 holds outgoing messages each of which includes an envelope and a payload. In addition, the task 14 may have one or more in-boxes for holding incoming messages from the resource mediator 12. Similarly, the resource handler 22 has an out-box to the resource mediator 12 and one or more in-boxes for holding messages from the resource mediator 12. The in-boxes and out-boxes are resources having corresponding resource descriptors in the repository 16.

The task 14 initiates an access to the resource 20 by generating a request 200 and placing the request 200 in its out-box to the resource mediator 12. The request 200 includes a primary resource field 40 along with a set of additional resource fields, a key-ring field 42, and a payload field 44. The primary resource field 40 holds a local name used by the task 14 to refer to a desired resource to be accessed. The key-ring field 42 holds a set of names each of which is a local name used by the task 14 to refer to a key-ring that will be used to unlock permissions associated with the primary resource named in the primary resource field 40 as well as any resources that designate the same resource handler as the primary resource. The payload field 44 specifies a resource-specific function to be performed on the primary resource.

The resource mediator 12 handles the request 200 by initially finding a resource descriptor in the repository 16 for the primary resource specified in the primary resource field 40. The information in the resource descriptor for the primary resource will be used to enforce visibility and unlock permissions and locate a resource handler for the primary resource. In this example, the primary resource field 40 holds a local name that the task 14 uses to refer to the resource 20. In one embodiment, the resource mediator 12 maintains a name space for the task 14 which associates or "binds" the local names used by the task 14 to references to resource descriptors in the repository 16. For example, the name space maintained for the task 14 may indicate that the local name for the primary resource contained in the primary resource field 40 maps to the resource descriptor 18.

Each key-ring named in the key-ring field 42 maps to a key-ring object that contains a set of keys that will be used to unlock permissions associated with all resources specified in the request having the same resource handler as the primary resource specified in the primary resource field 40. Each key-ring object has a corresponding resource descriptor in the repository 16 and each key is also an object having a corresponding resource descriptor in the repository 16. In one embodiment, the resource mediator 12 binds local names contained in key-ring field 42 to corresponding key-ring objects using the a name space associated with the task 14. For example, the name space maintained for the task 14 may indicate that a local name for a key-ring contained in the key-ring field 42 maps to a resource descriptor 17 and that a local name for a key contained on the key-ring maps to a resource descriptor 19.

The resource descriptors for the key-rings and the keys contained therein have allow and deny fields. Therefore, the use of individual key-rings and individual keys can be controlled by writing the allow and deny fields of their resource descriptors. The resource mediator 12 as the resource handler for key-ring and key resources can make key-rings and individual keys visible or not visible to the task 14 by manipulating these allow and deny fields and the mandatory key-rings of users.

Figure 2:
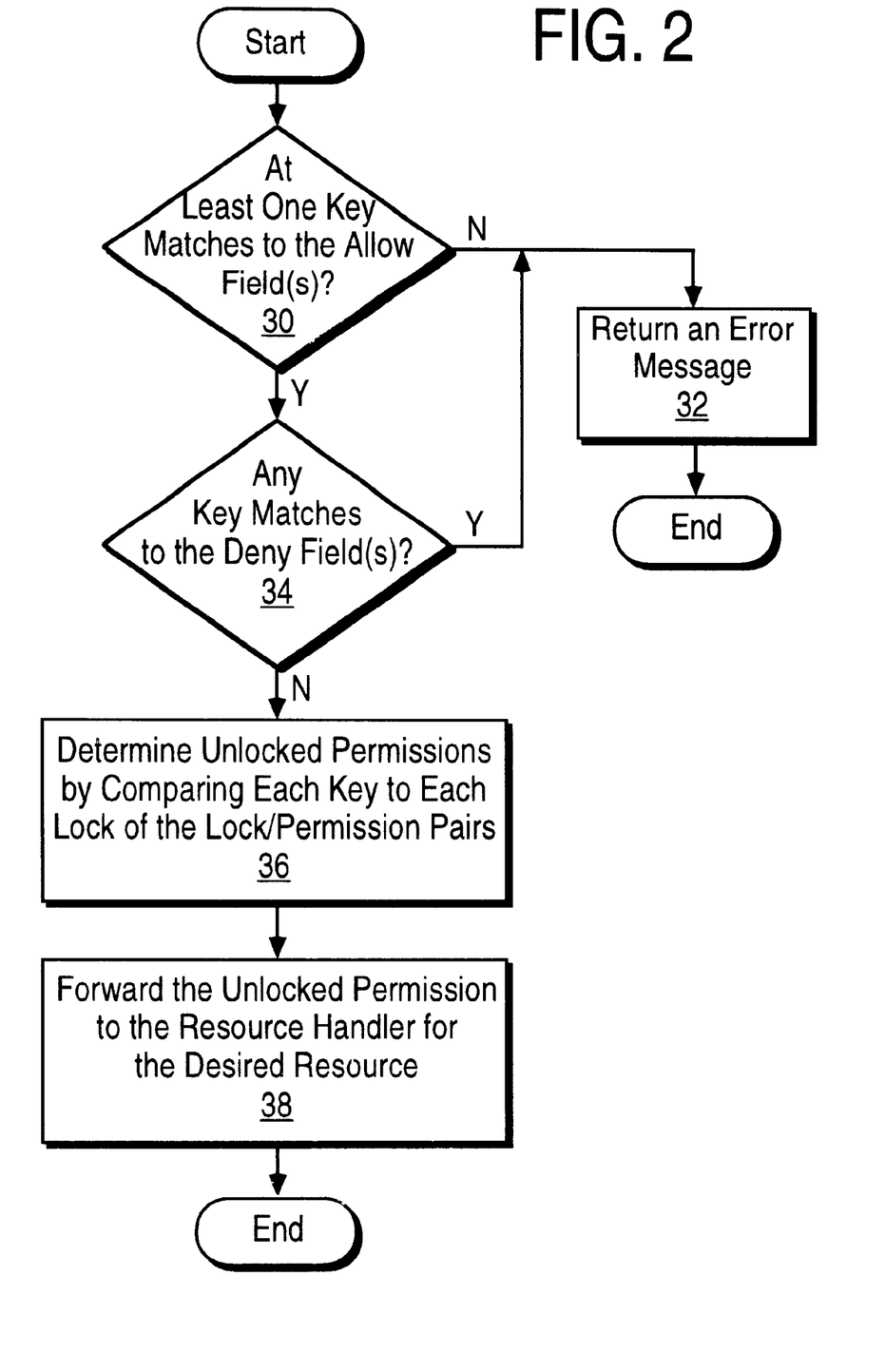
FIG. 2 illustrates the handling of a request for access to a resource by the resource mediator.

FIG. 2 illustrates the handling of the request 200 by the resource mediator 12 for the example in which the primary resource field 40 names the resource 20. At step 30, the resource mediator 12 determines whether at least one key contained on a key-ring specified in the key-ring field 42 matches to an allow field of the visibility fields 74. If at least one key does not match to an allow field then an error message is returned to the task 14 at step 32. The error message makes it appears to the task 14 that a binding to the resource 20 is not present in its name space. At step 30, if there are no keys in the allow field then control proceeds to step 34.

If at least one key matches to an allow field then at step 34 the resource mediator 12 determines whether any key contained on a key-ring specified in the key-ring field 42 matches to a deny field of the visibility fields 74. If any key matches to a deny field then an error message is returned to the task 14 at step 32.

If no key matches to a deny field then at step 36 the resource mediator 12 determines a set of unlocked permissions by comparing each key of each key-ring specified in the key-ring field 42 to each lock of each lock/permission pair in the lock/permissions fields 72. Consider an example in which the key-ring field 42 specifies one key-ring which contains the following keys—28CFA3, 857FHS, and AD9732—and the lock/permission fields 72 hold 28CFA3/read, 3F323B/write, and AD9732/execute. The resource mediator 12 matches the key of 28CFA3 to 28CFA3/read and unlocks a "READ" permission for the resource 20. Similarly, the resource mediator 12 matches the key of AD9732 to AD9732/execute and unlocks an "EXECUTE" permission for the resource 20. The "WRITE" permission for the resource 20 is not unlocked because the key of 3F323B was not presented in the request 200.

At step 38, the resource mediator 12 forwards the unlocked permissions to the resource handler for the resource 20. The resource mediator 12 obtains a reference to an in-box for the resource handler for the resource 20, i.e. the resource handler 22, from the resource handler field 70. The resource mediator 12 generates a forwarded message 202 and forwards it to the in-box of the resource handler 22. The forwarded message 202 includes a payload field 54 and the resource mediator 12 copies the contents of the payload field 44 of the request 200 into the payload field 54 of the forwarded message 202. The resource mediator 12 writes the unlocked permissions from step 36 into an unlocked permissions field 50 of the forwarded message 202. The resource handler 22 receives the forwarded message 202 and is responsible for interpreting any unlocked permissions, in this example READ and EXECUTE, and for performing any resource specific commands contained in the payload 54.

The responsibility of the resource mediator 12 is to unlock the permissions using the locks provided by the owner of the resource 20 and the keys provided by the task 14. As a consequence, the resource mediator 12 does not need to understand the permission semantics associated with the resource 20 nor the permission semantics of any of the potentially large numbers and differing type of resources to which it enables access.

The task 14 represents any software element that makes use of resources or digital services such as those associated with the resource 20. The task 14 may be an application program executing in the software system 10. The task 14 may also be a process executing in the software system 10 such as a user interface process that enables a user to launch and interact with various resources in the software system 10.

The resource 20 represents any local or remote resource which may be associated with the software system 10. The resource 20 may be a software resource such as a file, a database, a process, or an application program to name a few examples. The resource 20 may be hardware resource such as a memory segment, a storage device, a printer or other output device, a communication device, an input device, or a display device to name only a few examples.

The resource handler 22 manages the resource 20 and includes driver routines adapted to the particulars of the resource 20. For example, if the resource 20 is a file, the resource handler 22 includes driver routines for reading and writing file data to and from the physical medium that holds the file. The resource handler 22 may execute on the same computer system as the resource mediator 12 or on a different computer system with appropriate interconnect between computer systems.

A user that launches the task 14 is provided with an initial operating environment which includes a default name space. This default name space also contains a mandatory key-ring. The default resources are set up through the resource mediator 12 and provide a protection domain. A user logs into the software system 10 by generating a get user resource message to obtain an operating environment. The following is an example get user resource message:

get{coregrammar, USER=username, password=m20xyo}, bind to myname

The user resource with the name "username" is configured ahead of time with a set of resource descriptors in the repository 16. These resource descriptors include a default name space and a default key-ring. A single key on the mandatory key-ring or on a subsequently acquired key-ring may enable a user to have rights to many different capabilities associated with many different resources through the appropriate writing of lock/permission pairs in the resource descriptors in the repository 16. For example, a particular key may unlock the same or different permissions on different resources.

In addition, a resource may have more than one key associated with a permission. For example, a resource may have more than on read lock including a group lock for which every user in a group has a corresponding key. A particular permission for a user may be revoked by deleting the corresponding key from the repository 16.

The software system 10 maintains references to resources as bindings between local names used by tasks and references to resource descriptors in the repository 16. A binding may include one or more references to resource descriptors in the repository 16 and possibly other information.

The software system 10 enables user tasks to pass around bindings for resources. For example, if a first task places a message in its out-box that names a particular resource as the primary resource then a binding for the particular resource is passed to the recipient of the message when the message is delivered. In addition, the message may list a set of additional resources for which bindings are to be delivered when the message is delivered.

Resources for which bindings are passed among user tasks may be critical resources such as key-rings or keys or configuration or log files in the software system 10. Notify authorizers provide audit trails for these types of resources and in general any resource. Grant authorizers provide advanced security to control which users are to be allowed to obtain bindings for these types of critical resources and in general any resource.

Figure 3:
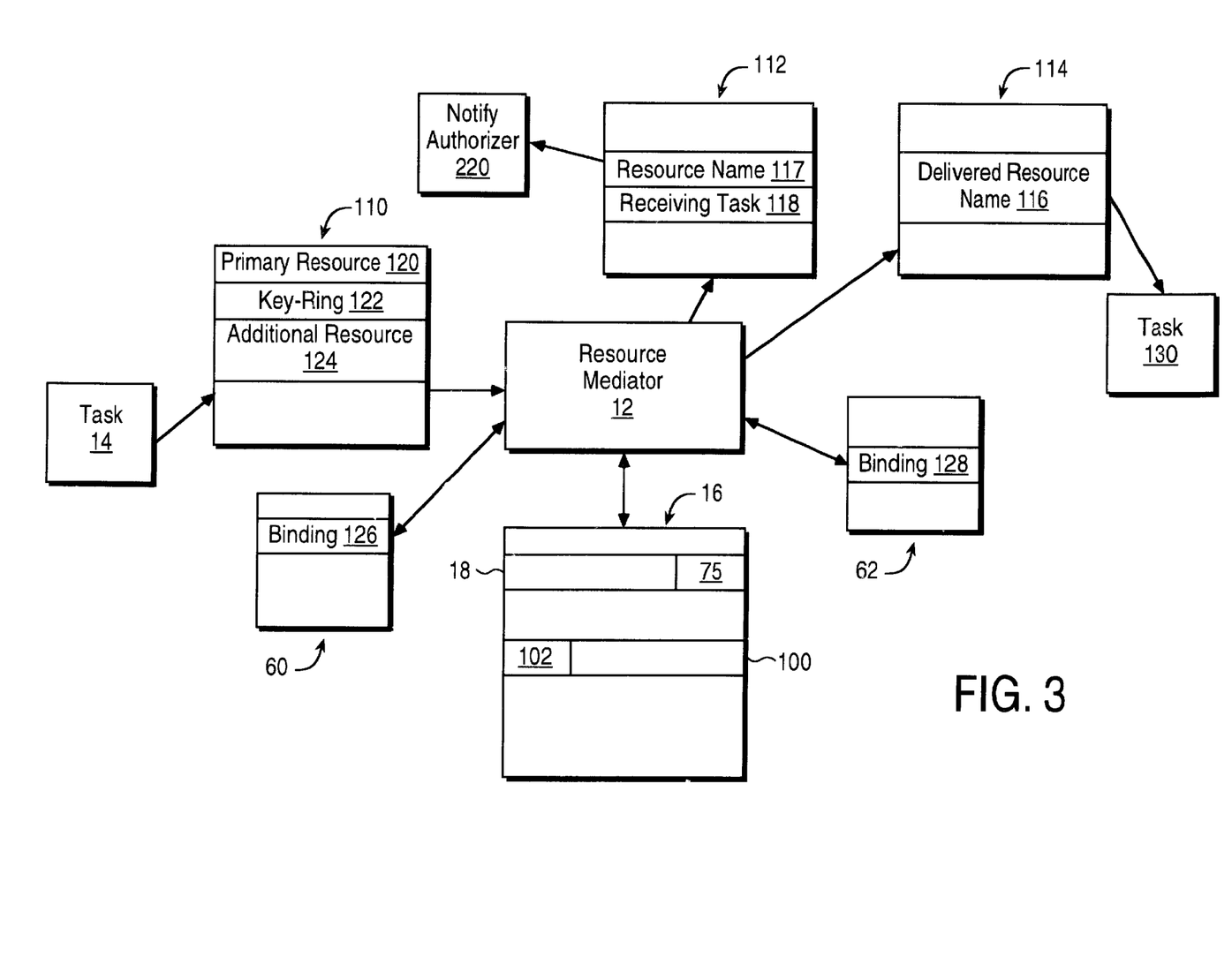
FIG. 3 illustrates the function of a notify authorizer when a binding for a resource is passed between user tasks.

FIG. 3 illustrates the function of a notify authorizer 220 for the resource 20 when a binding for the resource 20 is passed from the task 14 to a task 130. The authorizer fields 76 of the resource descriptor 18 specify the authorizer 220 as a notify authorizer for the resource 20. In one embodiment, this is accomplished by storing a reference to an in-box for the notify authorizer 220 in the authorizer fields 76 along with a bit that indicates a notify authorizer. The in-box for the notify authorizer 220 is a resource having a resource descriptor 100. The resource descriptor 100 includes a resource handler field 102 that specifies the notify authorizer 220 as the resource handler.

The task 14 passes a binding for the resource 20 to the task 130 by placing a message 110 in its out-box which includes a primary resource field 120 that identifies a resource for which the task 130 is the resource handler. The message 110 includes a key-ring field 122, and an additional resource field 124 which contains a local name which the task 14 uses to refer to the resource 20.

In the response to the message 110, the resource mediator 12 looks up the default name space associated with the task 14. The default name space forms part of a protection domain which is initially set up for the task 14. The default name space in this example is a name space 60 which is used by the resource mediator 12 to look up and resolve the names contained in the primary resource field 120 and the additional resource field 124. The resolution of the primary resource field 120 identifies the task 130 as the recipient of the message 110.

The resource mediator 12 constructs a forwarded message 114 for delivery to an in-box of the task 130. The forwarded message 114 includes a delivered resource name field 116 which holds names for any bindings which are being delivered with the forwarded message 114. For example, the delivered resource name field 116 holds a name for the resource 20. The resource mediator 12 obtains a binding 126 for the resource 20 from the name space 60 and writes it to a binding 128 for the resource 20 in a name space 62 which is associated with the task 130.

The resource mediator 12 also constructs a message 112 for transfer to the notify authorizer 220. The message 112 includes a resource name field 117 and a receiving task field 118 that informs the notify authorizer 220 that a binding for the resource 20 is being delivered to the task 130. The resource mediator 12 constructs similar messages for any other notify authorizers of resources for which bindings are being delivered.

Figure 4:
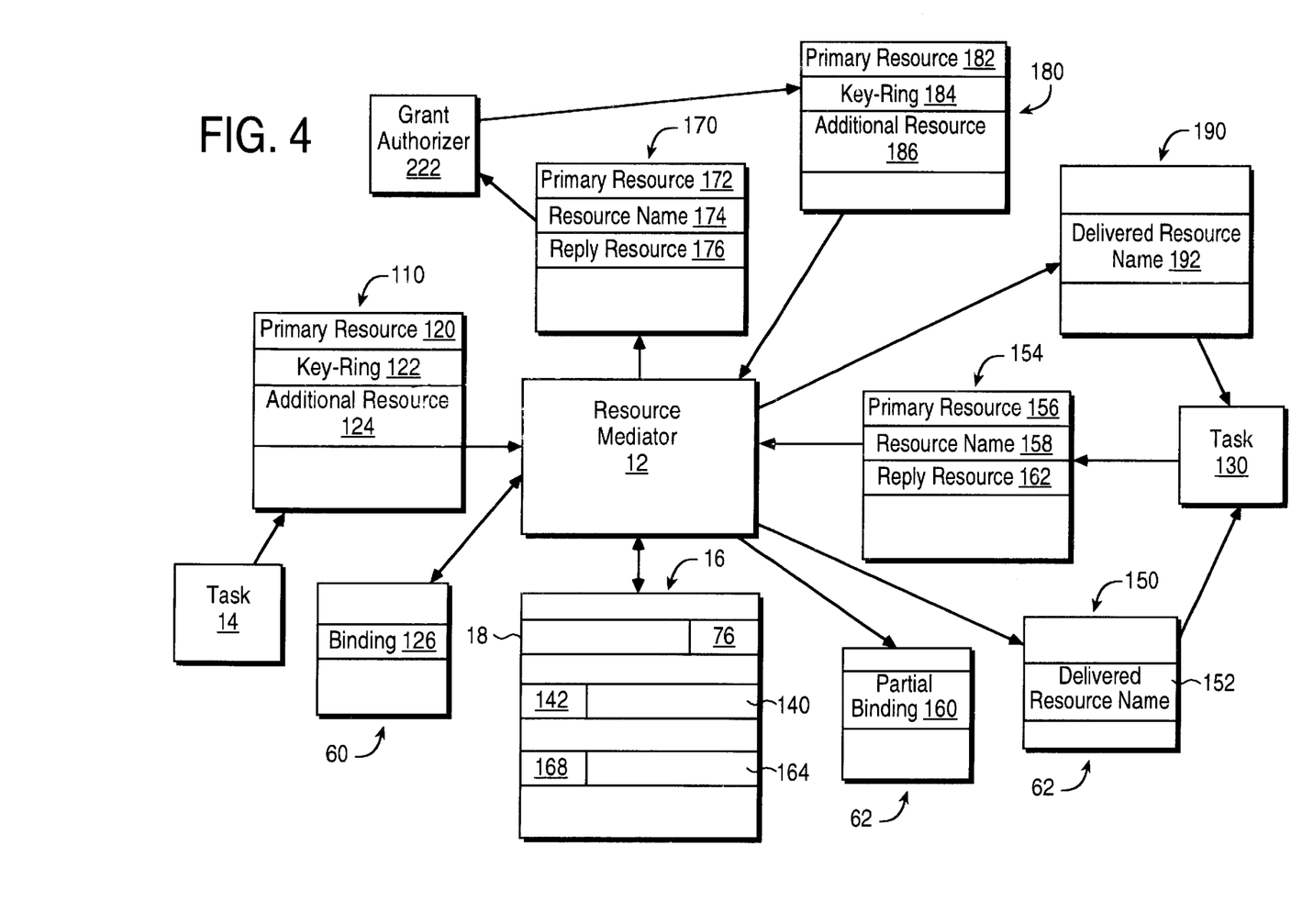
FIG. 4 illustrates the function of a grant authorizer when an attempt is made to pass a binding for a resource between user tasks.

FIG. 4 illustrates the function of a grant authorizer 222 for the resource 20 when a binding for the resource 20 is passed from the task 14 to the task 130. The authorizer fields 76 of the resource descriptor 18 in one embodiment store a reference to an in-box for the, grant authorizer 222 along with a bit that indicates a grant authorizer. The in-box for the grant authorizer 220 is a resource having a resource descriptor 140 which includes a resource handler field 142 that specifies the grant authorizer 222 as the resource handler.

The task 14 attempts to pass a binding for the resource 20 to the task 130 by placing the message 110 in its out-box including the primary resource field 120 that identifies a resource for which the task 130 is the resource handler. The message 110 includes the key-ring field 122, and the additional resource field 124 which contains a local name which the task 14 uses to refer to the resource 20. In the response, the resource mediator 12 looks up the name space 60 to resolve the names contained in the primary resource field 120 and the additional resource fields 124.

The resource mediator 12 constructs a forwarded message 150 for delivery to an in-box for the task 130. The forwarded message 150 includes a delivered resource name field 152 which holds a name for the resource 20. The binding for the resource 20 is not immediately delivered to the task 130. It is instead delayed and possibly will be denied by the grant authorizer 222.

The resource mediator 12 delivers the forwarded message 150 to the in-box of the task 130 and writes a partial binding 160 for the resource 20 into the name space 62. The partial binding is a reference to an in-box of the grant authorizer 222 and includes a flag which indicates it is a partial binding. If the task 130 attempts to use the partial binding 160, for example by placing the name associated with the partial binding 160 into the primary resource field of a request, then the resource mediator 12 returns a partial binding exception to the task 130. The partial binding 160 may be used by the task 130 to request completion of the delivery of the binding 126 for the resource 20. The partial binding 160 may be passed to another task in the software system 10 which could then request completion in the same manner as the task 130 requests completion.

The resource handler 22 requests completion of the partial binding 160 by generating a completion request 154 to the resource mediator 12. The completion request 154 includes a primary resource field 156 which holds a name for a resource for which the resource mediator 12 is the resource handler. The completion request 154 includes a resource name field 158 which holds a name for the resource 20 and which identifies the resource 20 as the resource for which completion of binding delivery is being requested. The completion request 154 includes a reply resource field 162 which identifies an in-box to the task 130 as a reply resource for the completion request 154. The in-box for the task 130 is a resource having a resource descriptor 164 which includes a resource handler field 168 that specifies the task 130 as the resource handler.

In response to the completion request 154, the resource mediator 12 generates a forwarded completion request 170 and writes it to an in-box of the grant authorizer 222. The forwarded completion request 170 includes a primary resource field 172, a resource name field 174, and a reply resource field 176 that carry the information from the primary resource field 156, the resource name field 158 and the reply resource field 162, respectively.

In response to forwarded completion request 170, the grant authorizer 220 performs its authorization procedure according to its own semantics and the information in the forwarded completion request 170. For example, the authorizer 220 may request a password from the task 130 by sending a message to the reply resource named in the reply resource field 176. This message may in turn name the in-box of the grant authorizer 222 as a reply resource to be used by the task 130 to return a password. Numerous other authorization procedures are possible.

The grant authorizer 222 completes the partial binding 160, if allowed by its authorization semantics, by generating a message 180 to the resource mediator 12. The message 180 includes a primary resource field 182 that names a resource for which the resource mediator 12 is the resource handler. The message 180 includes an additional resource field 186 which identifies the resource 20 as a resource for which a binding is to be delivered to the recipient of the message 180. The message 180 includes a key that unlocks a permission that informs the resource mediator 12 that the originator of the message 180 is the grant authorizer for the resource 20 and therefore has the right to deliver a binding for the resource 20 without further authorization.

In response to the message 180, the resource mediator 12 constructs a forwarded message 190 and writes it to an in-box of the task 130. The forwarded message 190 includes a delivered resource name field 192 which holds names for bindings which are being delivered with the forwarded message 190. For example, the delivered resource name field 192 holds a name for the resource 20. The resource mediator 12 obtains the binding 126 for the resource 20 from the name space 60 and writes it to the field in the name space 62 that held the partial binding 160 for the resource 20. Thereafter, the task 130 may use the complete binding for the resource 20 which is now available in the name space 62.

The authorization semantics implemented in the grant authorizer 222 are independent of the resource mediator 12. This structure enables advanced decentralized, i.e. outside of the resource mediator 12, security controls to be provided for name binding delivery, and therefore access control, without having to embed such controls in the resource mediator 12. The resource mediator 12 merely forwards messages to the appropriate authorizers that are registered in the repository 16.

There may be cases in which a particular key is associated with a grant authorizer and the particular key is contained on a particular key-ring which is not associated with a grant authorizer. There may also be cases in which a particular resource is associated with a grant authorizer and a binding to the particular resource is contained in a particular name space which is not associated with a grant authorizer. The particular key-ring and the particular name space may be referred to as composite resources.

The resource mediator 12 functions as an authorizer for composite resources to prevent security violations. For example, if a binding for the particular key-ring is passed in a message then the resource mediator 12 looks up the authorizer fields of each key on the particular key-ring and delivers only partial bindings for any keys for which grant authorizers are listed. Similarly, if a binding for the particular name space is passed in a message then the resource mediator 12 looks up the authorizer fields of each resource in the particular name space and delivers only partial bindings for any resources for which grant authorizers are listed. The recipient of the partial bindings may subsequently request completion of the partial bindings in a manner previously described.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A software system that provides access control to a set of resources, comprising:
   repository that holds a resource descriptor for each resource, each resource descriptor having a set of lock/permission pairs for the corresponding resource;
   resource mediator that obtains a request for access to a particular resource of the resources, the request providing a set of keys such that the resource mediator generates a set of unlocked permissions by comparing each key to each lock of the lock/permission pairs for the particular resource such that a permission of the lock/permission pairs is unlocked if at least one of the keys matches the corresponding lock, the resource mediator forwarding the unlocked permissions to a resource handler for the particular resource.

2. The software system of claim 1, wherein the request specifies a key-ring which is one of the resources having a corresponding resource descriptor in the repository and which the resource mediator associates with the keys.

3. The software system of claim 2, wherein each key is one of the resources having a corresponding resource descriptor in the repository.

4. The software system of claim 3, wherein the resource mediator enables a first task in the software system to transfer a binding for the key-ring to a second task in the software system such that the binding enables the second task to present the key-ring when generating a request for access to one of the resources.

5. The software system of claim 4, wherein the resource descriptor corresponding to one or more of the keys includes an authorizer field that specifies a grant authorizer task in the software system such that the resource mediator provides a partial binding for the key-ring to the second task when the first task attempts to transfer the binding for the key-ring to the second task.

6. The software system of claim 1, wherein the resource mediator enables a first task in the software system to transfer a binding for the particular resource to a second task in the software system such that the binding enables the second task to present the particular resource when generating a request for access to one of the resources.

7. The software system of claim 6, wherein the resource descriptor corresponding to the particular resource includes an authorizer field that specifies a notify authorizer task in the software system that is to be notified of the transfer of the binding from the first task to the second task.

8. The software system of claim 6, wherein the resource descriptor corresponding to the particular resource includes an authorizer field that specifies a grant authorizer task in the software system such that the resource mediator provides a partial binding for the particular resource to the second task when the first task attempts to transfer the binding for the particular resource to the second task.

9. The software system of claim 8, wherein the partial binding enables the second task to request completion of the transfer of the binding to the second task.

10. The software system of claim 8, wherein the second task requests completion of the transfer of the binding by generating a completion request to the resource mediator such that the resource mediator forwards the completion request to the grant authorizer task and the grant authorizer task validates the completion request according to a set of predetermined authorization semantics associated with the particular resource and then transfers the binding to the second task if authorized.

11. The software system of claim 1, wherein each resource descriptor includes a set of visibility fields for the corresponding resource including at least one allow field such that the resource mediator denies the request for access to the particular resource if none of the keys match to any lock in the allow field for the particular resource.

12. The software system of claim 1, wherein each resource descriptor includes a set of visibility fields for the corresponding resource including at least one deny field such that the resource mediator denies the request for access to the particular resource if any of the keys match to any lock in the deny field for the particular resource.

13. The software system of claim 1, wherein each resource descriptor includes a set of visibility fields for the corresponding resource including at least one allow field and at least one deny field such that the resource mediator denies the request for access to the particular resource if none of the keys match to any lock in the allow field for the particular resource or if any of the keys match to any lock in the deny field for the particular resource.

14. The software system of claim 1, wherein the resource mediator enables a first task in the software system to transfer a binding for the particular resource to a second task in the software system wherein the binding enables the second task to generate another request for access to the particular resource and wherein the resource descriptor corresponding to the particular resource includes an authorizer field that specifies a notify authorizer task in the software system that is to be notified of the transfer of the binding from the first task to the second task.

15. The software system of claim 1, wherein the resource mediator enables a first task in the software system to transfer a binding for the particular resource to a second task in the software system wherein the binding enables the second task to generate another request for access to the particular resource and wherein the resource descriptor corresponding to the particular resource includes an authorizer field that specifies a grant authorizer task in the software system such that the resource mediator provides a partial binding for the particular resource to the second task when the first task attempts to transfer the binding to the second task.

16. The software system of claim 15, wherein the partial binding enables the second task to request completion of the transfer of the binding to the second task.

17. The software system of claim 15, wherein the second task transfers the partial binding to a third task in the software system such that the third task requests completion of the transfer of the binding to the third task.

18. The software system of claim 15, wherein the second task requests completion of the transfer of the binding by generating a completion request to the resource mediator such that the resource mediator forwards the completion request to the grant authorizer task and the grant authorizer task validates the completion request according to a set of predetermined authorization semantics associated with the particular resource and then transfers the binding to the second task if authorized.

\* \* \* \* \*